stage
UNITED STATES PATENT OFFICE.

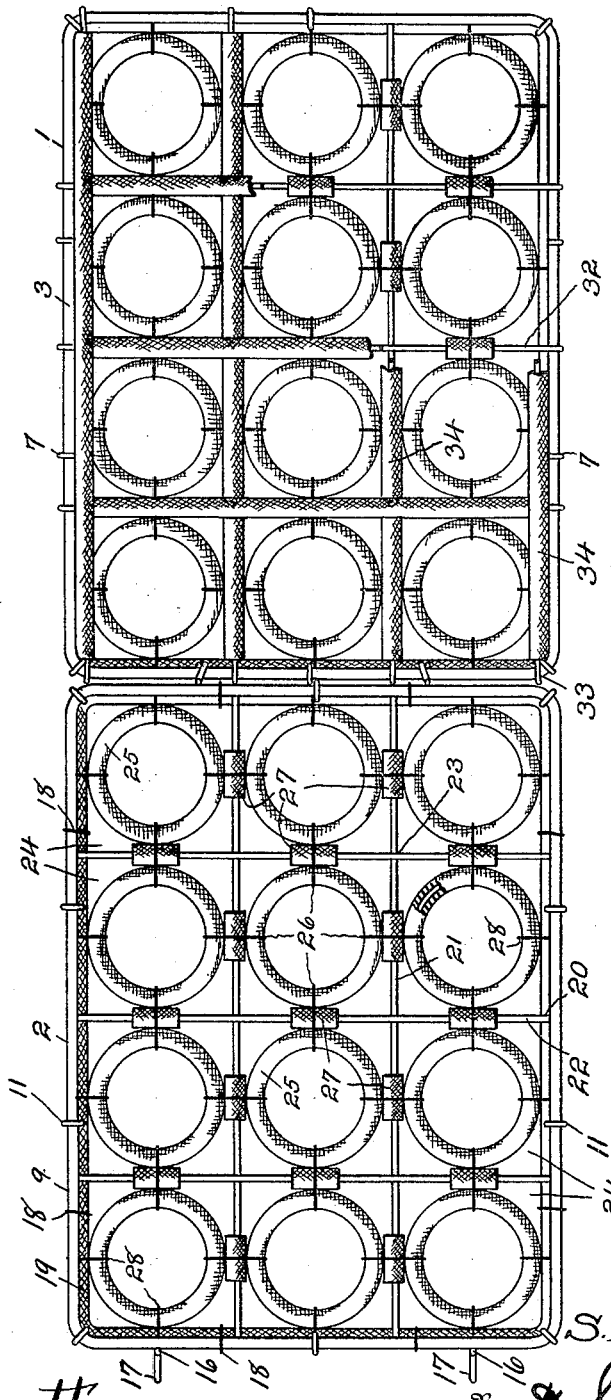

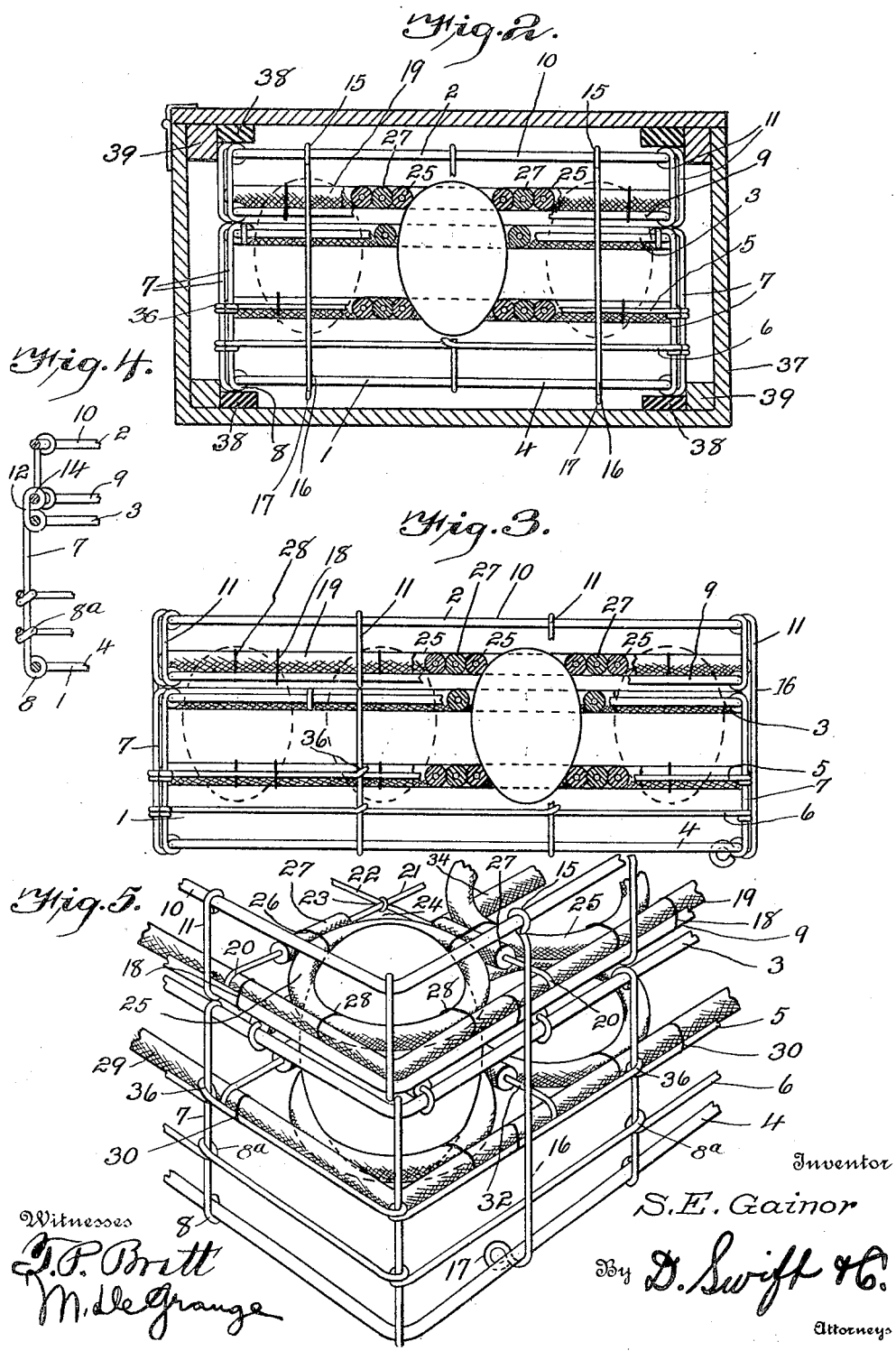

SUMMERS E. GAINOR, OF HALETHORP, MARYLAND.

EGG-SHIPPING CRATE.

1,133,849.  Specification of Letters Patent.  Patented Mar. 30, 1915.

Application filed March 16, 1914. Serial No. 824,952.

*To all whom it may concern:*

Be it known that I, SUMMERS E. GAINOR, a citizen of the United States, residing at Halethorp, in the county of Baltimore and State of Maryland, have invented a new and useful Egg-Shipping Crate; and I do hereby declare the following to be a full, clear, and exact description of the invention, such as will enable others skilled in the art to which it appertains to make and use the same.

This invention relates to an improved new and useful egg shipping crate, and an object of the invention is the provision of such a crate especially designed for shipping eggs with safety and against breakage by parcel post, express, freight and otherwise.

It is a known fact that by taking an egg and placing it endwise between the palms of the hand, and forcibly applying pressure, that it is extremely difficult to break the egg, substantially impossible. Therefore, it is the aim of this invention to construct and provide an egg crate based upon this principle. An egg crate based along these lines, it has been discovered, can withstand considerable usage and jolting.

With the above principle in view a crate has been devised comprising two members hingedly connected, one constituting substantially a base member, the other acting as a closure or cover member. These members are constructed in rectangular form and of wire, as shown and are provided with outer skeleton frames, and carried by said frames are opposing abutting surfaces comprising longitudinal and transverse wires connected to the outer frames and forming slightly yieldable net-work surfaces, in the large square openings of which opposing cushioned rings are arranged, between which the eggs are disposed. It will be observed that these rings engage the opposite ends of said eggs, and as the crate is jolted about, said net-work surfaces yield correspondingly and in unison. In other words, said net-work surfaces vibrate in unison, incident to the jolting.

Another feature of the invention is the provision of longitudinal and transverse cushioned wires intersecting the rows of eggs, and arranged substantially intermediate said vibrating net-work surfaces, to cushion said eggs in lateral directions, especially if some of the eggs are smaller than others and do not quite contact with said cushioned rings.

In practical fields the details of construction may necessitate alterations, falling within the scope of what is claimed.

The invention comprises further features and combination of parts, as hereinafter set forth, shown in the drawings and claimed.

In the drawings:—Figure 1 is a plan view showing the upper and lower hinged members thrown open, thereby showing the vibrating net-work surfaces with the cushioning rings, and illustrating the longitudinal and transverse cushioned wires, which cushion the eggs in lateral directions, showing portions of said lateral cushioning wires broken away, to illustrate the net-work surface and the cushion rings of the bottom member. Fig. 2 is an end view of the crate illustrating the same in a box, which is partly in section and showing said members (which are partly in section) closed and latched. Fig. 3 is a view in side elevation of the crate, showing parts broken away, to illustrate just how the eggs are arranged between said vibrating net-work surfaces. Fig. 4 is a detail view showing the hinged connections between the said members. Fig. 5 is a detail view in perspective, to more clearly illustrate the construction.

Referring more especially to the drawings, 1 designates the base member, while 2 denotes the cover or closure member. This base member comprises upper and lower rectangular frames 3 and 4, and intermediate correspondingly shaped rectangular frames 5 and 6. Connecting said upper and lower frames 3 and 4 at 8 are wire rods 7 arranged vertically, which are in turn connected at 36 and 8ª to the frames 5 and 6. The upper member 2 comprises the frames 9 and 10, corresponding in shape, and which are connected by the vertical brace wires 11. Two of said wires 7 at one end of the base member are constructed with extensions 12, that is, after coiling about the wire of the frame 3. These extensions 12 are coiled about the wire of the frame 9, as shown at 14, thereby hingedly connecting the closure or cover member 2 to the base member.

Pivotally connecting the wire of the frame 10 as at 15 at the end of the member 2 opposite said hinged connections are the clasp wires 16, the lower ends of which terminate in resilient hooks 17, to engage under the wire of the frame 4, thereby clasping the two members in locked relations, as shown clearly in Figs. 2 and 3 of the drawings, as well as in Fig. 5.

Fastened adjacent and to the sides and ends of the frame 9 by the wrappings of small wire 18 is a rubber covered or coated wire frame 19, corresponding in shape to the frame 9. This rubber of the frame 19 may be in tubular form, and the wire passed through the same. However, in the present instance, it has been found more practicable to supply the rubber coating to said wire by vulcanizing in the usual manner.

Extending longitudinally and transversely of the member 2, and connected at 20 to the sides and ends of the rubber coated frame 19 are the wires 21 and 22, which intersect one another as shown at 23. These wires 21 and 22 are so arranged as to form a vibrating mesh-work with large square openings 24.

Arranged in the openings 24 are the rubber covered or coated rings 25, which are bound together and to the wires 21 and 22 by the bindings of the small wires 26. Portions of said wires 21 and 22 are provided with rubber cushions 27 vulcanized or otherwise connected or attached to said wires. These cushions 27 are arranged adjacent the rubber coated or covered rings 25, in order to additionally cushion the same. All the rubber covered rings 25 are bound to the rubber coated frame 19 by the small bindings of fine wire 28, that is, excepting two of said rings 25, which two rings are located centrally of the member 2.

The base or bottom member of the crate has a rubber coated frame 29 similar to the frame 19, and which is bound to the wire frame 5 by the small bindings of wire 30. This rubber coated frame 29 is constructed with a vibrating net-work surface 32 comprising the longitudinal and transverse wires and rubber coated rings, similarly arranged and constructed to the vibrating net-work surface of the cover or top member 2, and the parts thereof are correspondingly designated. Extending longitudinally and transversely of the base member, and connected to the sides and ends of the frame 3, as shown at 33 are the rubber vulcanized or coated wires 34, which form square openings, as shown clearly in Fig. 1. These longitudinal and transverse rubber covered wires 34, as will be observed, when the cover or top member is closed upon the base member, are interposed between said vibrating net-work surfaces of said top and base members, thereby constituting means for cushioning the eggs in a lateral direction, especially if some eggs are smaller than others, and do not quite engage said rubber covered rings of the vibrating surfaces. Only the frame 6 is soldered at 8ª to the wire rods 7, while the frame 5 has a sliding connection with the wire rod 7, as shown at 36. In this manner the frame 5 may be adjusted vertically, so as to accommodate eggs varying in length. However, this frame 5 may be held in adjusted position owing to frictional contact with the wire rods 7.

The rubber of the various wire parts may be in tubular form, and telescoped on the wire, but the preferable and practical manner in applying this rubber covering or sheaths may be vulcanized to the wire.

This form of crate may be increased in length or in width, or in both, in order to accommodate various quantities of eggs. However, in the present instance the crate is constructed to contain a dozen eggs. In shipping a crate of eggs in this manner, the crate is placed in a suitable box, such as shown in Fig. 2 and designated by the numeral 37, there being bumpers of rubber 38 to prevent the crate from jolting in the box, at the same time cushioning the same. The top and bottom of the box are also constructed with strips 39 to prevent movement of the crate in the box.

The invention having been set forth, what is claimed as new and useful is:—

1. An egg shipping crate comprising two opposing upper and lower sections, hingedly connected; the lower part of the upper section having a rectangular frame; the upper and lower parts of the lower section having rectangular frames, and provided with rods connecting the frames of the lower section; the lower section having two rectangular frames intermediate the upper and lower frames of the lower section, one of said intermediate frames being fixed to the rods, the other intermediate frame being adjustable on said rods below the upper frame of the lower section; the lower frame of the upper section and the intermediate adjustable frame being provided with tube cushions, and longitudinal and transverse intersecting connected wires forming rectangular openings; cushioned rings in said openings to engage the ends of the eggs and being bound to said frames, and the longitudinal intersecting wires.

2. An egg shipping crate comprising two opposing upper and lower sections hingedly connected; the lower part of the upper section having a rectangular frame; the upper and lower parts of the lower section having rectangular frames, and provided with rods connecting the frames of the lower section; the lower section having two rectangular frames intermediate the upper and lower frames of the lower section; the lower frame of the upper section and one of the intermediate frames being provided with tube cushions; the lower frame of the upper section and the upper frame of the lower section and one of the intermediate frames being provided with longitudinal and transverse intersecting connected wires forming rectangular openings; cushioned rings in said openings of the lower frame of the upper section and the intermediate frame and being bound to said frames and the intersecting wires; the intersecting wires of the upper frame of the lower section having tube cushions to contact with the central portions of said eggs.

In testimony whereof I have signed my name to this specification in the presence of two subscribing witnesses.

SUMMERS E. GAINOR.

Witnesses:
ROBERT A. BOSWELL,
DEAN SWIFT.

Copies of this patent may be obtained for five cents each, by addressing the "Commissioner of Patents, Washington, D. C."